US009188429B2

(12) United States Patent
Braghiroli

(10) Patent No.: US 9,188,429 B2
(45) Date of Patent: Nov. 17, 2015

(54) METHOD OF DETERMINING ROTARY ANGLE RELATED DATA OF A VEHICLE WHEEL

(71) Applicant: Snap-on Equipment Srl a unico socio, Correggio (re) (IT)

(72) Inventor: Francesco Braghiroli, Reggio Emilia (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 339 days.

(21) Appl. No.: 13/707,282

(22) Filed: Dec. 6, 2012

(65) Prior Publication Data

US 2014/0157895 A1    Jun. 12, 2014

(51) Int. Cl.
*G01M 1/22* (2006.01)
*G01B 11/24* (2006.01)
*G01B 21/26* (2006.01)
*G01M 17/04* (2006.01)

(52) U.S. Cl.
CPC ............... *G01B 11/24* (2013.01); *G01B 21/26* (2013.01); *G01M 1/225* (2013.01); *G01B 2210/26* (2013.01); *G01M 17/04* (2013.01)

(58) Field of Classification Search
CPC ...................................... G01M 1/225

USPC ............................................ 73/462
See application file for complete search history.

(56) References Cited

U.S. PATENT DOCUMENTS 4,285,240 A * 8/1981 Gold .............................. 73/462
4,912,661 A * 3/1990 Potter ........................ 702/147

FOREIGN PATENT DOCUMENTS

EP    1 398 610 A1    3/2004
EP    1 731 891 A1    12/2006

* cited by examiner

*Primary Examiner* — John Chapman, Jr.
(74) *Attorney, Agent, or Firm* — McDermott Will & Emery LLP

(57) ABSTRACT

A method and an apparatus for determining rotary angle related measurement data of a body mounted rotatable about an axis of rotation, the body being a vehicle wheel or a part of a vehicle wheel, in particular a tire or a rim, the method comprising the steps of obtaining measurement data comprising a plurality of measurement data elements of the rotating body together with respective measuring times, determining at least one rotational speed or revolution period of the body for at least one point in time, and associating the obtained measurement data elements to respective rotary angles of the body based on the respective measuring times and the at least one rotational speed or revolution period of the body.

15 Claims, 5 Drawing Sheets

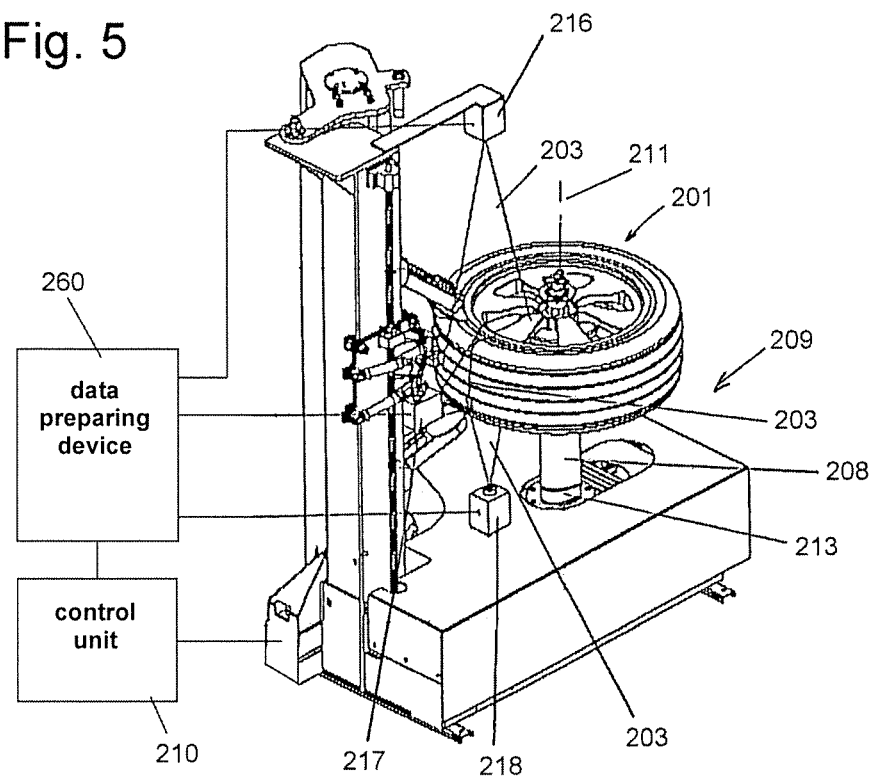

METHOD OF DETERMINING ROTARY ANGLE RELATED DATA OF A VEHICLE WHEEL

The disclosure concerns a method of determining rotary angle related data of a body, in particular a motor vehicle wheel or a part of a vehicle wheel mounted rotatable about an axis of rotation, and an apparatus for carrying out that method.

BACKGROUND ART

From EP patent application 1 731 891, a method and apparatus for obtaining rotary angle related data of vehicle wheels in a wheel balancer is known. In that wheel balancer, vibration forces caused by imbalance of the wheel and variations of forces caused by a load roller bearing against the tyre are determined with respect to the rotary angle of the wheel. The determined rotary angle related vibration force data is used to calculate sizes and mounting positions of balancing weights for balancing the wheel. The determined rotary angle related load force data is used to improve balancing operation.

Another method or apparatus determining rotary angle related data of a vehicle wheel is known from EP patent 1 398 610 and relates to a vehicle wheel service apparatus such as wheel balancers or tyre mounting or demounting machines which are scanning the surface of the wheel by a preferably contactless sensor device in order to obtain geometrical data of the wheel. This geometrical data is rotary angle related data and may represent a three dimensional model of the geometrical shape and position of the wheel or of parts of the wheel. That rotary angle related data is used for diagnostic purposes or serves to improve the balancing operation or the tyre mounting operation in order to improve running characteristics of the wheel.

In the methods and apparatuses of the prior art, a rotary angle sensor is used in order to generated rotary angle position signals. That rotary angle position signals captured during measurement are then associated to the measurement data obtained from the force sensors or surface sensors in order to generate rotary angle related data such as imbalance measurement data, load force variation data or three dimensional geometrical data of the wheel. Such rotary angle sensors are required to detect the rotary position of the rotating wheel with a resolution sufficient to create suitable and precise rotary angle related data. Common rotary angle sensors comprise magnetic or optical sensors detecting the dents of a toothed wheel, for example, each tooth representing a certain rotary angle increment. Providing a rotary angle sensor having a suitable resolution increases both costs and number of parts of an apparatus.

SUMMARY OF THE INVENTION

An object of the disclosure is to provide a method and an apparatus of the kind set forth in the opening part of this specification, with which a rotary angle sensor may be omitted and rotary angle related data of a wheel can be determined without using a rotary angle sensor.

In a first aspect, the invention provides a method of determining rotary angle related measurement data of a body mounted rotatable about an axis of rotation, the body being a vehicle wheel or a part of a vehicle wheel, in particular a tyre or a rim, the method comprising the steps of obtaining measurement data comprising a plurality of measurement data elements of the rotating body together with respective measuring times, determining at least one rotational speed or revolution period of the body for at least one point in time, and associating the obtained measurement data elements to respective rotary angles of the body based on the respective measuring times and the at least one rotational speed or revolution period of the body. In this manner, a separate rotary angle sensor measuring the rotary position of the wheel rotating about may be omitted so that costs and the number of constituent parts of an apparatus carrying the method will be reduced. Furthermore, the angular resolution of the measurement data may advantageously set or increased independent from an angular resolution of a rotary angle sensor.

The respective rotary angles may be relative rotary angles of the measurement data elements in relation to each other. For certain purposes it may be sufficient to obtain relative rotary angles of measurement data elements in relation to each other, such as quality control purposes which do not require ascertaining the absolute rotary position of a measured non-uniformity of the tyre or wheel. For example, scalar values of an imbalance of a wheel or a radial or lateral runout of a wheel or rim may be determined from measurement data having relative rotary angle information without information about the exact rotary position or direction of the non-uniformity if merely a quality evaluation is performed and it is not intended to correct the non-uniformity. This means that relative rotary angle information associated to the measurement data elements is used to form a measurement data sequence representing a complete circumferential scan or a complete revolution of the wheel in order to provide a sufficient data basis for the calculation of the imbalance or runout. In another application, relative rotary angles of the measured data elements of two data sensors simultaneously scanning the radial runout of the rim and the tyre or wheel, respectively, may be used to determine a rotary angular shift of the tyre with respect to the rim in a tyre remounting operation for mutually compensating rim and tyre runout (so called tyre/rim matching operation). In this case the absolute rotary position or direction of the runout of rim and tyre is not needed and it is sufficient to output the desired rotary angular shift of the tyre with respect to the wheel, such as a shift of 90° in clockwise direction. That information can be used by an operator or can directly used by an automatic tyre mounting/demounting machine to perform the matching operation.

In another embodiment of the invention, the respective rotary angles are absolute rotary angles of the measurement data elements in relation to a rotary reference angle. In this case, the non-uniformities of a wheel such as an imbalance or a runout are determined exactly with respect to their rotary angular positions in relation to the wheel and can be advantageously used to correct a detected non-uniformity or to improve a balancing operation, for example.

The method may further comprise determining the rotary reference angle based on the measurement data, preferably based on the autocorrelation function or the first harmonic of the measurement data.

The autocorrelation function and the first harmonic of a sequence of measurement data normally contain characteristic features if the measured wheel is not perfectly uniform, i.e. not perfectly circular and centered on the rotary axis in shape and perfectly balanced. A characteristic feature or value of an autocorrelation function of the measurement data sequence is the peak repeatedly occurring after a time shift corresponding exactly one revolution of the wheel. This peak may represent a unique rotary reference angle or reference position of the wheel which is used as an absolute rotary zero position for further evaluation of the measurement data and for performing a required correction operation such as attachment of balancing weights. The characteristic feature of a first harmonic of the measurement data sequence (calculated by a Fast Fourier Transformation algorithm for example) may be the rising zero crossing, for example, which also occurs once per revolution of the wheel and represents a unique rotary reference angle of a wheel. If a wheel is perfectly shaped and balanced, of if the non-uniformities are below a certain threshold, then it may be difficult or even impossible to determine the rotary reference angle based on the measurement data. However, in this case the wheel is perfect or nearly perfect and no correction operation is required so that the rotary reference angle is not required at all.

In case of measurement data obtained from a surface position sensor such as a laser sensor scanning the surface of the wheel, characteristic features of the measurement data sequence may result from intentionally provided unique surface elements on the wheel such as a inflation valve or a labelling or marking provided in the rubber structure of the sidewall of the tyre.

In a further development of the invention, providing that the speed of rotation of the wheel is monitored and the rotation of the wheel is controlled with sufficient precision, for example by an electric motor driving controller, the respective rotary reference angle of the wheel may be stopped at a desired point of rotation so as to enable the operator or the apparatus perform a service operation at the suitable rotary position of the wheel. In other words, it is possible to stop the wheel such that a balancing weight attachment location is in the 12 o-clock position or in front of an indicator, for example, so that the operator is enabled to attach the balancing weight at the correct position.

In an independent further development of the invention, the method may further comprise determining the rotary reference angle based on at least one rotary reference position signal indicating at least one rotary reference position of the body. This signal may be provided by a separate rotary angular reference position sensor detecting a reference position feature or element passing the sensor once per one revolution of the wheel. That element may be rotationally coupled to the rotary axis of the wheel, for example. It is also possible to provide two or more elements representing respective rotary reference positions of the body, or to provide two or more rotary angular reference position sensors in order to enhance precision and/or reliability of the apparatus and method.

In an independent further development of the invention, the method may further comprise determining the at least one rotational speed of the body based on the measurement data, preferably based on the autocorrelation function or the first harmonic of the measurement data. As described above, the autocorrelation function and the first harmonic of a measurement data sequence have unique characteristic features occurring once per one revolution of the wheel. This enables to determine the speed of rotation of the wheel and the revolution period.

In an alternative embodiment of the invention, the method may further comprise determining the at least one rotational speed or revolution period of the body based on the at least one rotary reference position signal. In this case, the rotational speed or revolution period may be determined based on the period between two consecutive passes of the rotary reference position at the rotary angular reference position sensor. In this case, the determined rotational speed represents an average speed of a complete revolution of the wheel. Alternatively, the rotational speed or revolution period may be determined from a pulse width or amplitude of the rotary reference position signal depending from the rotational speed of the wheel when the passing reference position element is detected by the sensor. In this case, the determined rotational speed or revolution period represents an instantaneous value of the rotational speed of the wheel. In a further development of the invention, such an instantaneous value of rotational speed or revolution period may be determined alternatively at the beginning or at the end of a considered measurement data sequence. It is also possible to determine two or more instantaneous or averaged values of rotational speed or revolution period in order to monitor stability of the rotational speed or to compensate a variation in rotational speed when associating the measurement values to respective rotary angles of the wheel. For example, measurement of imbalance forces may be made without exerting a driving force onto the wheel in order not to affect the vibration force measurement. In this case, the wheel will decelerate somewhat during a measuring period. The speed difference between the beginning and the end of the measuring period corresponding to one or a plurality of wheel revolutions may be determined by several instantaneous values of rotational speed or revolution period and the association of the measurement data elements to the respective rotary angles of the wheel may be compensated accordingly.

Alternatively, the rotational speed or revolution period of the wheel may be determined by another sensor known in the art, or based on the electric motor control of the motor driving the rotational axis on which the wheel is mounted. Determining the rotational speed of an electric motor based on the driving control means is known in the art. It is also possible to rotate the wheel with a predetermined constant rotational speed so that this predetermined rotational speed or revolution period of the wheel may be taken for further data processing and measurement or determination of the rotational speed or revolution period is not necessary.

According to an independent embodiment of the method of the invention, the measurement data are obtained by at least one vibration sensor detecting accelerations or forces acting onto the axis of rotation, in by particular vibration sensors of a wheel balancer. This may be performed in a wheel balancer in order to calculate wheel imbalance for quality checking purposes or for a balancing operation.

According to a further independent embodiment of the method of the invention, the measurement data are obtained by at least one load force sensor detecting forces acting onto the tyre of the wheel, in particular forces exerted by a load roller or load belt onto the tyre. The rotary angle related data relating to the load forces may be advantageously used to check quality of a tyre, a rim or a wheel (tyre/rim assembly), to improve a balancing operation in a wheel balancer, or to improve the mounting position of a tyre on a rim in a tyre mounting/demounting apparatus, for example.

According to another independent embodiment of the method of the invention, the measurement data are obtained by at least one position sensor scanning the surface of the tyre and/or the rim and determining the distance/position of scanned surface points with respect to a reference location. Preferably, the position sensors are contactless sensors such as optical sensors. The rotary angle related data relating to the geometric shape of a wheel or of parts of a wheel may be advantageously used to check quality of a tyre, a rim or a wheel (tyre/rim assembly), to improve a balancing operation in a wheel balancer, or to improve the mounting position of a tyre on a rim in a tyre mounting/demounting apparatus, for example.

According to a second aspect, the invention provides an apparatus for determining rotary angle related measurement data of a body mounted rotatable about an axis of rotation, the body being a vehicle wheel or a part of a vehicle wheel, in particular a tyre or a rim, wherein the apparatus is configured to carry out a method according to the invention as described above.

The apparatus may be an automotive shop service device such as a wheel balancer, a tyre mounting or demounting machine, a wheel alignment system, a roller test stand, a rim or tyre testing equipment.

According to another embodiment of the invention, the apparatus may be a stand-alone device connectable to an automotive shop service device. In this case, the apparatus may be a portable scanner, for example, suitable to be arranged near a wheel mounted at the axle of a vehicle. The wheel will be rotated by the vehicle or by another device such as a roller test stand, while the apparatus may scan the wheel.

In a third aspect, the invention provides a computer program product comprising a computer-readable medium carrying computer-executable code which, when executed by a processor, enables the processor to carry out a method according to the invention as described above.

BRIEF DESCRIPTION OF THE DRAWINGS

The invention will be described in greater detail hereinafter with reference to the Figures in which:

FIG. 5 shows a tyre mounting/demounting machine according to a third embodiment of the invention.

PREFERRED EMBODIMENT

The illustrated preferred embodiment of the invention relates to a wheel balancer similar to that described in EP patent 1 398 610. This wheel balancer comprises three optical surface scanning devices (laser scanners) for contactless scanning the surface of a wheel and determines the geometrical shape of the tyre and the position of a geometrical axis of the wheel with respect to a rotational axis of the wheel (imperfect shape of the wheel rim and/or the tyre). It has to be noticed that the invention is not restricted to this special embodiment of a wheel balancer, but may be applied to a variety of vehicle wheel service apparatuses as described above.

Figure 1:
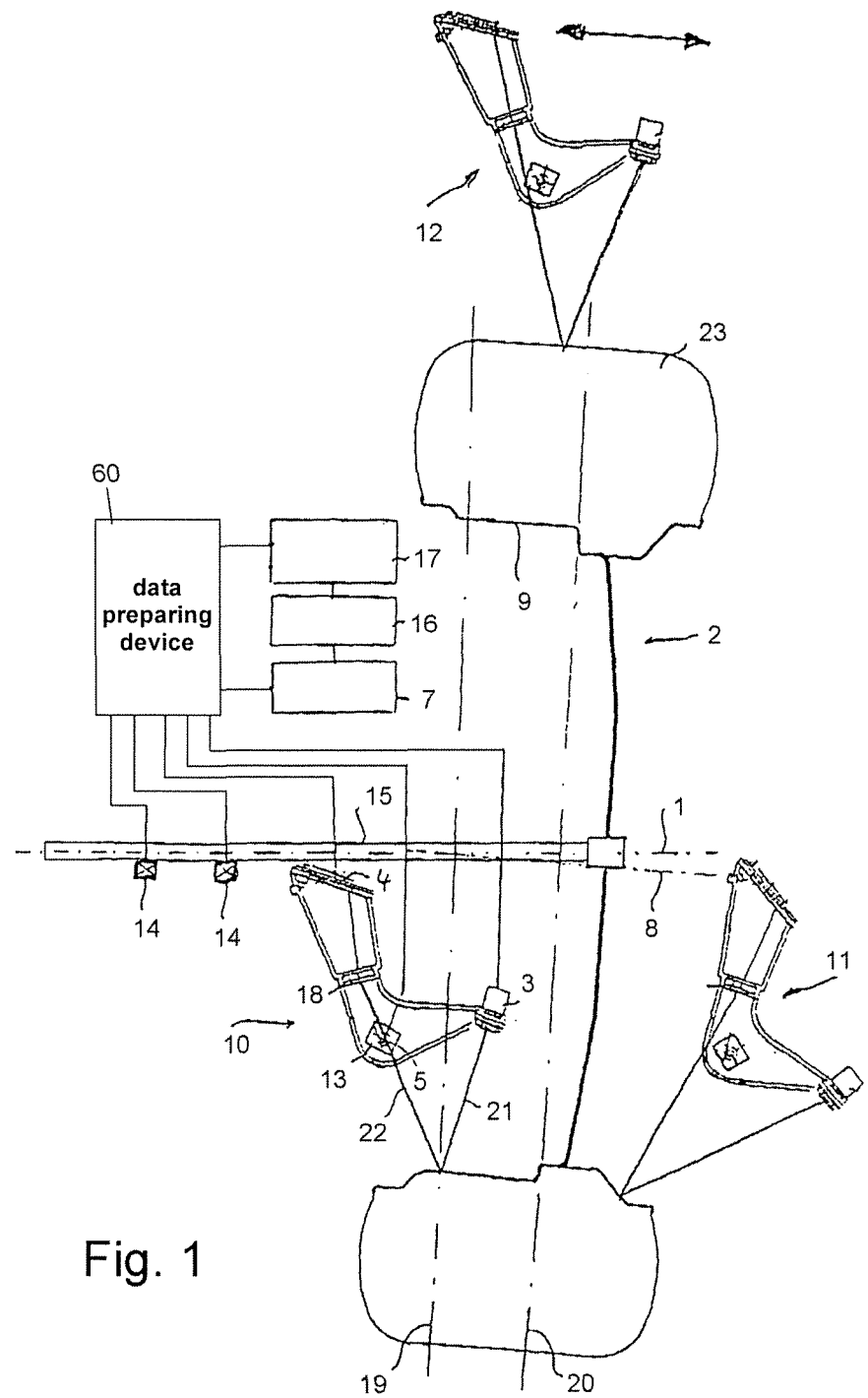
FIG. 1 shows a wheel balancer according to a first embodiment of the invention.
Figure 2:
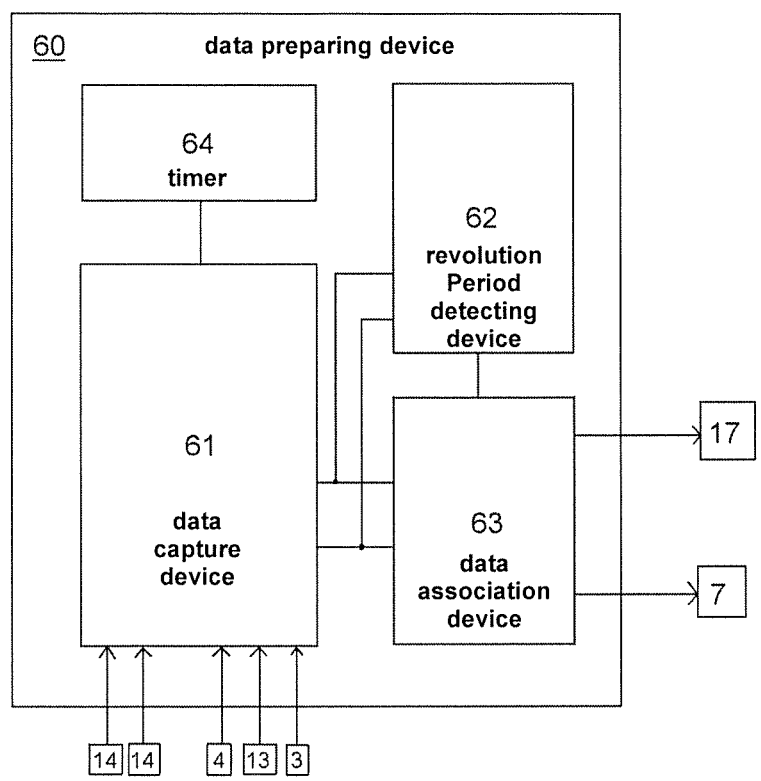
FIG. 2 shows a block diagram of a data preparation device according to a first embodiment of the invention.

According to a first preferred embodiment of the invention shown in FIGS. 1 and 2, a wheel balancer comprises a main shaft 15 which is supported rotatable about an axis of rotation 1 on the frame structure of a wheel balancing machine (not shown) in known manner, for example as is illustrated in WO 00/14503. A motor vehicle wheel 2 can be fixed to the main shaft 15. In an imbalance measuring run, the motor vehicle wheel 2 is rotated about the axis of rotation 1 and forces resulting from a wheel imbalance are measured by means of force measuring sensors 14 and evaluated in an imbalance evaluation device 17. In the evaluation procedure imbalance parameters are calculated in terms of balancing mass and rotary angle position. The balancing masses are then fixed in the form of balancing weights to the wheel in known manner at the calculated rotary angle positions to compensate for the wheel imbalance.

In order to calculate imbalance parameters with respect to the rotary angle position of the wheel, it is necessary to associate the measurement data elements to respective rotary angles or rotary positions of the wheel. This requires determination of a rotary reference angle to which rotary angles of the measurement data elements are to be related. Therefore, the measurement data of the sensors 14 is treated by a data preparation device 60. The measured forces are obtained by a data capture device 61 from the sensors 14 as measurement data elements together with respective measuring times so as to form a measurement data sequence. The data capture device 61 may comprise or may be connected to a timer 64 for associating timestamps to the measurement data elements. A revolution period detecting device 62 determines the rotational speed or revolution period of the wheel on the basis of the measurement data sequence. To this, the revolution period detecting device 62 receives from the data capture device 61 the measurement data sequence having time information and determines a characteristic feature of the measurement data sequence. Preferably, the device 62 calculates an autocorrelation function of the data sequence. An autocorrelation function of a periodic signal has characteristic peaks occurring every period of the signal, i.e. every time when a time shift of the autocorrelation corresponds to an integer multiple of the period. Since in the present embodiment the measurement data sequence is captured from a rotating body, the period of the measurement data sequence corresponds to one revolution of the body. Having determined the distance between two peaks of the autocorrelation function, the revolution period of the wheel (body) and thus the rotational speed of the wheel are obtained.

It is also feasible to determine other characteristic features within the measurement data sequence in order to obtain the revolution period of the wheel. For example, the device 62 may determine the absolute maxima and/or minima of the data sequence which normally occur once per revolution of the wheel. To enhance reliability of the determination of the revolution period, in case there are several maxima or minima per revolution having similar values, i.e. a similar amplitude, and similar time distance to each other, it is possible to take an integer multiple of the time distance between the maxima, for example, as a basis for a calculation of a first harmonic of the data sequence, for example by Fast Fourier Transformation (FFT). Then, the lowest frequency of the obtained spectrum having a significant amplitude (approximately corresponding to the amplitude of the data sequence) corresponds to first harmonic or the revolution period of the wheel, respectively. It is also feasible to directly apply an FFT to the measurement data sequence in order to calculate the first harmonic as is known in the art. The period of the first harmonic corresponds to the revolution period of the wheel.

Having determined the revolution period or rotational speed of the wheel, a characteristic point of the measurement data sequence may be taken to determine the respective measurement data element as being associated to the rotary reference angle which may be assumed to be the zero angle, for example. Suitable characteristic points are, for example, the raising or falling zero crossing of the first harmonic or a maximum or a minimum of the first harmonic or of the data sequence. Also characteristic discontinuities of the data sequence may be used as rotary reference angle, such as discontinuities obtained when an inflation valve is scanned by an optical surface sensor scanning the surface of the wheel.

Assuming the rotational speed being constant during the measurement period which may comprise more or less than one revolution period of the wheel, a data associating device 63 determines, taking the measuring time corresponding to the rotary reference angle received from the device 62 as a basis, the rotary position of the wheel at each measuring time of the measurement data elements by comparison of the revolution period of the wheel (received from the revolution period detecting device 62) and the respective measuring times of the individual data elements of the measurement data sequence (received from the data capture device 61). The measurement data elements can then be associated to respective rotary angles of the wheel. In this manner, data associating device 63 provides the forces measured in an imbalance measuring run in the form of rotary angle related measurement data enabling the intended evaluation of the wheel imbalance. The devices 61, 62 and 63 may be separate devices which may be connected or integrated to a data preparation device 60 as shown in FIG. 2, or may be implemented by software modules executed by a general evaluation device which may be a computer module in the wheel balancer.

Figure 3:
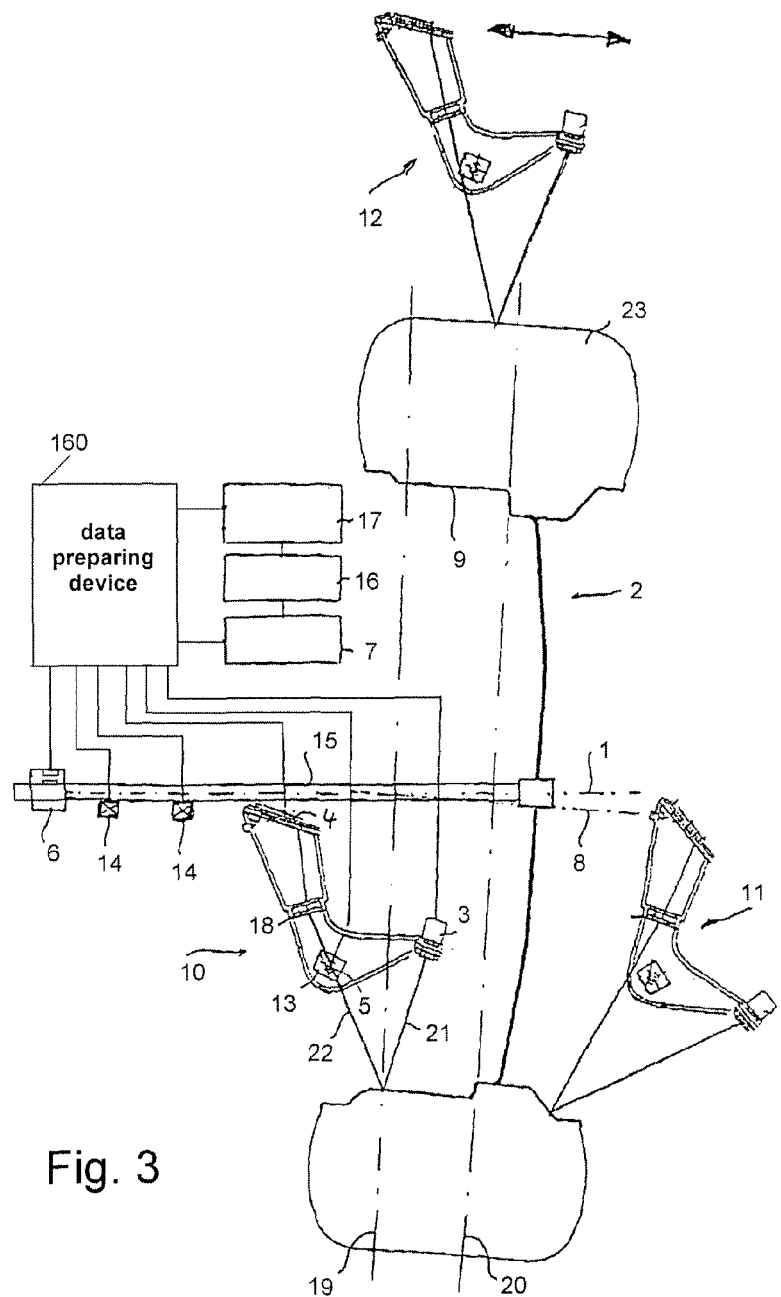
FIG. 3 shows a wheel balancer according to a second embodiment of the invention.
Figure 4:
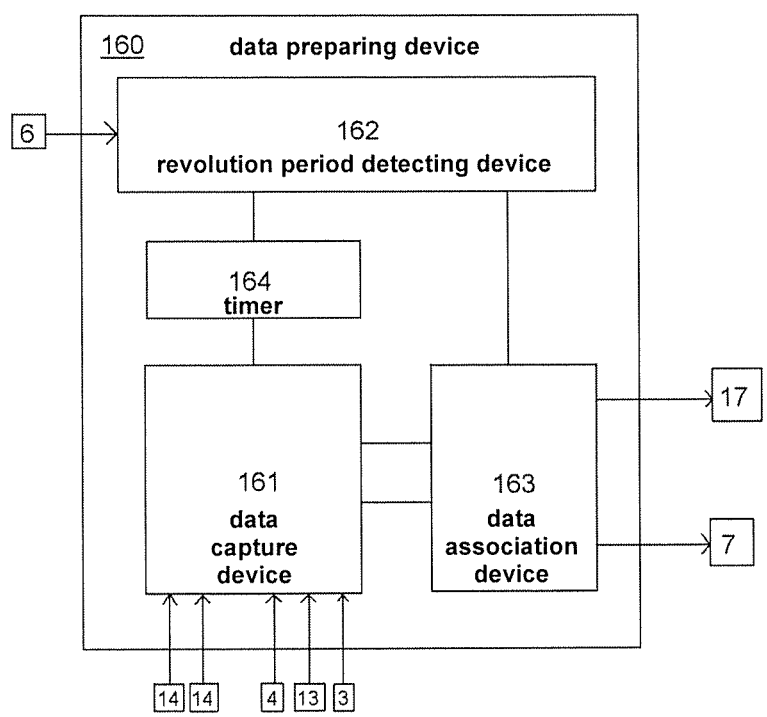
FIG. 4 shows a block diagram of a data preparation device according to a second embodiment of the invention.

Alternatively to the first embodiment described above, in a second preferred embodiment shown in FIGS. 3 and 4, a data preparation device 160 additionally receives a reference position signal of a reference position sensor 6. A data capture device 161 provides timestamps for the received measuring data elements similar to the device 61 in connection with a timer 164. A revolution period detecting device 162 determines the rotational speed or revolution period of the wheel by detecting two consecutive signal pulses of a reference position sensor 6. The sensor 6 generates a signal pulse each time a marking feature marking a reference position of the wheel is passing the sensor. The marking feature may be, for example, a magnetic or optical element detectable by a magnetic or optical sensor 6. Thus, the period between two consecutive pulses corresponds to the revolution period of the wheel (the reciprocal value of which is the rotational speed). Then, the data associating device 163 determines rotary angle related data by associating rotary angles of the wheel to the respective measurement data elements on the basis of the measurement data sequence received from the data capture device 161 and the revolution period received from the revolution period detecting device 162 together with the determined rotary reference angle corresponding to the reference position of the wheel in a manner analogue to the device 63 of the first embodiment of FIGS. 1 and 2.

In a further preferred embodiment, the driving of the rotational axis of the wheel is switched off during the measuring run in order not to affect the force measuring by any vibrations or forces generated by the driving motor. This means that the rotational speed or the wheel decreases during a imbalance measuring over several revolutions of the wheel. In order to obtain precise rotary angle related measurement data of the wheel, it is necessary to compensate for that rotational speed deceleration. Therefore, the rotational speed or revolution period of the wheel in an imbalance measuring run is measured at least both at the beginning of the measuring run and at the end of the measuring run by detecting the revolution period of the wheel in the first measuring run revolution and in the last measuring run revolution. Then, a rotational speed development curve is interpolated between the beginning and the end of the measuring period.

The rotary angle related measurement data are then output by the data preparation device 60 to an imbalance evaluation device (computer) 17. As mentioned above, the data preparation device 60 and the imbalance evaluation device 17 may be implemented as software modules executed by a computer module of the wheel balancer.

When the motor vehicle wheel 2 is fixed to the main shaft 1 by way of conventional clamping means, it frequently happens that the geometrical axis 8 of the wheel does not exactly coincide with the axis of rotation 1. That gives rise to imbalance measurement results which are falsified in relation to the actual imbalance of the wheel.

In the illustrated embodiments the precise positioning of the motor vehicle wheel 2 with respect to the axis of rotation 1 and thus the positioning of the geometrical axis 8 of the wheel with respect to the axis of rotation 1 can be determined. In FIG. 1, for the purposes of explanation, the geometrical axis of the wheel is arranged exaggeratedly eccentrically and with an angle of inclination relative to the axis of rotation 1 of the main shaft 15.

The illustrated embodiment involves the use of a scanning device 3 with which a scanning light beam 21, for example a laser beam, is directed onto a plurality of measurement points which are on the surface of the wheel. A spacing measuring device 4 receives a respective reflected beam 22 and produces a measurement signal proportional to the spacing of the measurement point from a reference location 5. The scanning device 3 and the spacing measuring device 4 can be combined to form a spacing measuring unit 10 or 11, 12 respectively and can be mounted on the machine frame structure pivotable about a common pivot axis which together with a pivot angle sensor 13 forms the reference location 5. It is however also possible to select another reference location 5 which is fixed with respect to the machine.

Preferably the spacing measuring unit 10 is in the form of a triangulation measuring device as is known from EP 1 174 698 A2. The known triangulation measuring device has the scanning device 3 which is in the form of a light source and a CCD-sensor as the spacing measuring device 4. The beam 22 which is reflected from a scanned measurement point is focused by way of an optical receiver 18 onto a given position on the CCD-sensor of the spacing measuring device 4. The CCD-sensor can detect separately from each other a plurality of local maxima of an illumination intensity function. The direction of the beam 22 which is reflected from the measurement point depends on the distance of the measurement point relative to the scanning device 3. The reflected beam therefore goes by way of the optical receiver 18 onto a given position on the CCD sensor which produces a spacing-dependent measurement signal resulting therefrom.

Also the measurement data sequence obtained from the spacing measuring units 10, 11 and 12 are treated by the data preparation device 60, as explained above with respect to the imbalance force data from the sensors 14 in order to provide rotary angle related geometric data (measurement data) of the wheel.

In the illustrated embodiments, the position of the motor vehicle wheel 2 is determined with respect to the axis of rotation 1 by a procedure involving scanning a plurality of measurement points disposed on at least two peripheries around the axis of rotation 1. Those peripheries are in planes 19, 20 perpendicular to axis of rotation 1, on a part of the wheel, preferably the wheel rim 9. For the purposes of implementing the position measurement procedure, the spacings of two measurement points which are in two planes 19 and 20 at least two such peripheries are determined in relation to the reference location 5 on the machine.

In the embodiment illustrated in FIG. 1 the scanning light beam 21 is directed onto measurement points in the plane 19. The motor vehicle wheel 2 which is clamped on the main shaft 15 is rotated so that provided on the periphery of the scanned part of the wheel is a number of measurement points which for example corresponds to the number of light pulses, more particularly laser pulses, or to the number of laser sensor readings (distance or position data) output by the laser sensor device. The respectively reflected light beams 22 are received by the spacing measurement device 4 and, as already explained, converted into corresponding spacing measurement signals.

After the operation of measuring the spacings of the measurement points which are in the plane 19, the scanning light beam 21 is directed onto the peripheral part of the wheel (being the wheel rim 9) in the plane 20. The spacings of the measurement points which are on the periphery of that part of the wheel are also measured in that plane, as discussed above, while the wheel is rotating.

The planes 19 and 20 which are perpendicular to the axis of rotation 1 can be disposed such that the measurement points are on a corresponding inside periphery of the wheel rim 9. The at least two planes 19 and 20 can be disposed such that they intersect surface portions of the wheel rim 9, which extend substantially parallel to the axis of rotation 1. That is the case for example with the plane 20. In addition the respective plane can be disposed such that it intersects a part of the rim extending inclined or substantially perpendicular with respect to the axis of rotation 1, as is the case with the plane 19.

As the common pivot axis at the reference location 5, about which the scanning device 3 and the spacing measuring device 4 are pivotable, is provided fixedly on the frame structure of the machine and the precise positioning of the scanning device 3 and the spacing measuring device 4 on the frame structure of the machine and thus with respect to the axis of rotation 1 is determined by means of the pivot angle sensor 13, that provides exact spacing measurements in respect of the measurement points in the two planes 19 and 20 with respect to the axis 1 of the wheel. As already discussed above, it is also possible to adopt another reference location which is provided fixedly on the frame structure of the machine.

The respective rotary angle position is also determined for the respective measurement points, preferably by means of the data preparation device 60 as described above with reference to FIGS. 1 and 2 or, alternatively, the data preparation device 160 as described above with reference to FIGS. 3 and 4. The data preparation device 60, 160 is connected to the electronic evaluation system 7.

The evaluation device 7 includes a computer which, from the spacing measurement values in respect of the respective measurement points and the associated rotary angle values provided by the data preparation device 60, computes the positioning of the measurement points disposed on an inside surface of the wheel rim, in the two planes 19 and 20, with respect to the axis of rotation 1. The position of the motor vehicle wheel 2 with respect to the axis of rotation 1 can be directly derived therefrom. That positional information can include an eccentric and/or inclined position of the geometrical axis 8 of the wheel with respect to the axis of rotation 1, which causes falsification of the measurement values in regard to wheel imbalance, as are ascertained by the force measuring sensors 14.

The deviations of the position of the geometrical axis 8 of the wheel from the axis of rotation 1, in other words the exact positioning of the motor vehicle wheel 2 with respect to the axis of rotation 1, can be fed as correction values to an error compensating device 16. The error compensating device 16 provides for suitable correction of the balancing parameters (balancing mass and angular position) which are calculated in the imbalance evaluation device 17.

In the case of the embodiment illustrated in FIG. 1, a spacing measurement operation is effected in the region of the inner peripheral surface of the inward part of the wheel rim. It is however also possible to implement the spacing measuring operation at the outwardly disposed part of the rim by means of a spacing measuring unit 11 which is of the same structure as the spacing measuring unit 10 (see FIG. 2). It is also possible to provide for evaluation of the spacing values which were ascertained by the two spacing measuring units 10 and 11. For that purpose the spacing measuring unit 11 is also connected to the electronic evaluation system 7 via the data preparation device 60.

It is also possible to use the spacing measuring unit 11 which carries out spacing measurement procedures on the outwardly disposed part of the wheel rim to implement operations for determining the positions of wheels which are mounted to the motor vehicle, in the manner as was described above with reference to FIG. 1. In that case the axis of rotation 1 is determined by the respective rotatable wheel fixing on the motor vehicle. In this case, a rotary reference angle of the wheel may be determined based on the measurement data, preferably by means of evaluation of unique characteristics of a autocorrelation function or a first harmonic derived from the measurement data as described above with reference to FIGS. 1 and 2. It is also possible to determine a rotary reference angle by detecting particular unique surface shapes of the wheel, such as an inflation valve or a labelling on the side wall of the tyre.

The spacing measuring unit 10 or 11 or also both spacing measuring units 10 and 11 can be used to ascertain the wheel profiles, in particular the profiles of the wheel rim 9 at the inside and/or outside of the wheel, as is known from EP 1 174 698 A2. It is in dependence thereon that it is possible to determine optimum positions for balancing weights on the wheel rim 9.

It is also possible to use the spacing measuring units 10 and 11 to scan the pneumatic tyre 23 of the motor vehicle wheel in respect of geometrical irregularities such as lateral wobble or run-out or radial wobble or run-out. For that purpose, it is also possible to provide an additional spacing measuring unit 12 which can be directed onto the tread surface of the pneumatic tyre 23. For that purpose the spacing measuring unit 12 can be displaced parallel to the axis of rotation 1 and can possibly be mounted pivotable about a pivot axis.

When scanning the pneumatic tyre 23, particularly when the wheel is rotating, with different degrees of inflation of the pneumatic tyre, it is possible to detect irregularities in the tyre, in particular in regard to differences in tyre stiffness, by means of the spacing measurements in respect of the measurement points on different peripheries at the side walls of the pneumatic tyre 23 and/or at the tread surface of the pneumatic tyre.

The invention thus provides a comprehensive diagnosis of the quality of the motor vehicle wheel and also the motor vehicle tyre by contactless scanning.

Instead of the pivotable spacing measuring units 10 to 12 shown in FIGS. 1 and 3, spacing measuring units mounted on extendable (telescopic) arms or mounted on a rail system for linearly moving the spacing measuring units may be used. Generally, it is not important how the spacing measuring units are mounted or moved to scan the surface of the tyre or wheel, as long as the spacing of the measured surface points of the wheel to a reference point or a spatial position of the measured point with respect to a reference point (for example a point on the rotary axis of the wheel) may be determined in order to capture geometrical data of the scanned tyre or wheel.

In a further development of the invention, at least one of the pivotable spacing measuring units 10, 11 and 12 may be replaced by a fixedly mounted spacing measuring unit using the stripe-of-light technology. Such units emit a planar light beam generating lines of light when impinging on a target, in this case a wheel surface. This planar light beam may be generated by a cylindrical lens expanding a laser beam in one spatial direction. The line of light generated on the wheel surface is observed (i.e. the light reflected from the wheel surface is received) by a two dimensional CCD camera, for example, which is mounted in a position spaced apart from the laser emitting device. The line of light projected on the image area of the CCD camera is distorted in dependence on the shape of the wheel surface and the observation angle defined by the distance of the wheel surface and the distance between the laser emitting device and the CCD camera. In this case, a single point triangulation between a projection point on the CCD surface and an impingement point on the wheel surface may be performed in order to determine the position (spacing) of the light impingement point on the wheel surface in relation to a reference point. Such a stripe-of-light (or sheet-of-light) sensor unit and the corresponding working principle is described in EP 2 332 749 A1, for example. Of course, the method of determining rotary angle related measurement data according to the invention may be applied to the tyre mounting/demounting machine shown in EP 2 332 749 A1, too.

FIG. 5 shows a third preferred embodiment of the invention comprising a tyre mounting or demounting machine using stripe of light sensor units 216, 217, 218 for scanning the surface of the wheel 201 in order to determine geometrical data of the wheel 201. The wheel 201 is fixed to a rotatable support 208 having a rotary axis 211 and a driving motor 213. The base 209 of the machine has a post carrying tyre mounting tools. The sensor units 216, 217, 218 are projecting stripes of light 203 onto the tread and onto both sides of the wheel 201. A data preparation device 260 operating similar to the data preparation device 160 is connected to the sensor units 216, 217, 218 in order to provide rotary angle related measurement data of the scanned wheel 201. The device 260 outputs these rotary angle related data to a control unit 210 of the tyre mounting/demounting machine. Since the radial and lateral runout of the wheel and of the rim may be determined simultaneously by this sensor arrangement when the edge of the rim is scanned together with the tyre or parts of the tyre, it is not necessary to determine a rotary reference angle to which the measurement data element are to be related. It is sufficient that the control device evaluates relative rotary angles of the measurement data elements with respect to each other. These relative rotary angles may be determined by the data preparation device 260 without determining or defining a rotary reference angle. When the control unit 210 of the tyre changer (tyre mounting or demounting machine) determines the radial runout (first harmonic) of the wheel and of the rim from the rotary angle related measurement data provided by the data preparation device 260, a relative rotary angular shift (remounting position) of the tyre with respect to the rim may be determined which minimizes the wheel runout as is known in the art. Thus, a costly rotary angle encoder usually used to determine the rotary angles of the measurement data elements, or a reference position sensor 6 for determining a reference position of the wheel (or of the rotatable support 208) are not required in the tyre changer of the third embodiment of the invention. Of course, it is also possible to use a reference position sensor 6 and a data preparation device 160 as shown in FIG. 3 with the third embodiment shown in FIG. 5.

LIST OF REFERENCES 1 axis of rotation
2 motor vehicle wheel
3 scanning device
4 spacing measuring device
5 reference location
6 reference position sensor
7 evaluation device for the wheel position
8 geometrical axis of the wheel
9 wheel rim
10 spacing measuring unit
11 spacing measuring unit
12 spacing measuring unit
13 pivot angle sensor
14 force measuring sensor
15 main shaft of a wheel balancing machine
16 error compensating device
17 imbalance evaluation device
18 optical receiving means
19 plane
20 plane
21 scanning light beam
22 reflected light beam
23 pneumatic tyre
60, 160, 260 data preparation device
61, 161 data capture device
62, 162 revolution period detecting device
63, 163 data association device
64, 164 timer

The invention claimed is:

1. A method of determining rotary angle related measurement data of a body mounted rotatable about an axis of rotation, the body being a vehicle wheel or a part of a vehicle wheel, the method comprising the steps of:
   obtaining measurement data comprising a plurality of measurement data elements of the rotating body together with respective measuring times,
   determining at least one rotational speed or revolution period of the body for at least one point in time, and
   associating the obtained measurement data elements to respective rotary angles of the body based on the respective measuring times and the at least one rotational speed or revolution period of the body.

2. The method according to claim 1,
   wherein the measurement data comprise at least two measurement data element sequences of two simultaneously measuring sensor devices.

3. The method according to claim 1,
   wherein the respective rotary angles are relative rotary angles of the measurement data elements in relation to each other.

4. The method according to claim 1,
   wherein the respective rotary angles are absolute rotary angles of the measurement data elements in relation to a rotary reference angle.

5. The method according to claim 4, further comprising determining the rotary reference angle based on the measurement data and based on an autocorrelation function or a first harmonic of the measurement data.

6. The according to claim 4, further comprising determining the rotary reference angle based on at least one reference position signal indicating at least one reference position of the body.

7. The method according to claim 1, further comprising determining the at least one rotational speed or revolution period of the body based on the measurement data and based on an autocorrelation function or a first harmonic of the measurement data.

8. The method according to claim 1, further comprising determining the at least one rotational speed or revolution period of the body based on at least one reference position signal indicating at least one reference position of the body.

9. The method according to claim 1, wherein the measurement data are obtained by at least one vibration sensor detecting accelerations or forces acting at the axis of rotation.

10. The method according to claim 1, wherein the measurement data are obtained by at least one load force sensor detecting forces acting at the tyre of the wheel.

11. The method according to claim 1, wherein the measurement data are obtained by at least one position sensor scanning the surface of the tyre and/or the rim and determining the position of scanned surface points with respect to a reference location.

12. An apparatus for determining rotary angle related measurement data of a body mounted rotatable about an axis of rotation, the body being a vehicle wheel or a part of a vehicle wheel, the apparatus comprising:

a main shaft rotatable about the axis of rotation and having the body mounted thereon;

force measuring sensors configured to measure a plurality of measurement data elements of the rotating body; and a data preparation device, wherein the data preparation device is configured to carry out the method according to claim 1.

13. The apparatus according to claim 12, wherein the apparatus is one of a wheel balancer, a tyre mounting or demounting machine, a wheel alignment system, a roller test stand, and a rim or tyre or wheel testing equipment.

14. The apparatus according to claim 12, wherein the apparatus is a stand-alone device which can be connected to an automotive shop service device or to an external system.

15. A computer program product comprising a non-transitory computer-readable medium carrying computer-executable code which, when executed by a processor, enables the processor to carry out a method according to claim 1.

* * * * *